(12) United States Patent
Zweig et al.

(10) Patent No.: US 11,461,404 B2
(45) Date of Patent: Oct. 4, 2022

(54) SYSTEM AND METHOD FOR ADJUSTMENT OF A DEVICE PERSONALITY PROFILE

(71) Applicant: Intuition Robotics, Ltd., Ramat-Gan (IL)

(72) Inventors: Shay Zweig, Harel (IL); Roy Amir, Mikhmoret (IL); Itai Mendelsohn, Tel Aviv-Jaffa (IL); Assaf Sinvani, Modiin (IL); Dor Skuler, Oranit (IL)

(73) Assignee: Intuition Robotics, Ltd., Ramat-Gan (IL)

( * ) Notice: Subject to any disclaimer, the term of this patent is extended or adjusted under 35 U.S.C. 154(b) by 599 days.

(21) Appl. No.: 16/453,270

(22) Filed: Jun. 26, 2019

(65) Prior Publication Data

US 2019/0392003 A1    Dec. 26, 2019

Related U.S. Application Data

(60) Provisional application No. 62/690,005, filed on Jun. 26, 2018.

(51) Int. Cl.
*G06F 16/9035* (2019.01)
*G06N 20/00* (2019.01)
*G06F 16/22* (2019.01)

(52) U.S. Cl.
CPC ...... *G06F 16/9035* (2019.01); *G06F 16/2264* (2019.01); *G06N 20/00* (2019.01)

(58) Field of Classification Search
CPC . G06F 16/9035; G06F 16/2264; G06N 20/00; G06N 3/006

USPC .......................................................... 706/12
See application file for complete search history.

(56) References Cited

U.S. PATENT DOCUMENTS

| | | | |
|---|---|---|---|
| 7,937,337 B2 | 5/2011 | Lee et al. | |
| 8,244,653 B2* | 8/2012 | Jager ................ | H04M 1/72454 706/23 |
| 8,682,485 B2 | 3/2014 | Anhalt et al. | |
| 8,996,429 B1* | 3/2015 | Francis, Jr. .......... | G06F 16/214 706/45 |
| 10,841,247 B2* | 11/2020 | Rico ...................... | A63F 13/75 |
| 11,045,957 B2* | 6/2021 | Luo ...................... | B25J 11/0005 |
| 2002/0087498 A1 | 7/2002 | Yoshida | |
| 2009/0117819 A1 | 5/2009 | Nakamura | |
| 2009/0192649 A1 | 7/2009 | Yen | |
| 2012/0302824 A1 | 11/2012 | Hasimi | |

(Continued)

*Primary Examiner* — Ashish Thomas
*Assistant Examiner* — Abdullah A Daud
(74) *Attorney, Agent, or Firm* — M&B IP Analysts, LLC (57) ABSTRACT

A system and method for adjusting a device personality profile. The method includes: generating a first user profile; selecting a first personality profile for a device based on matching the first user profile to a cluster of user profiles, wherein the first personality profile includes a first distribution of character traits in a multidimensional space; sampling a character trait; causing the device to execute at least a physical interaction item, based on the sampled character traits; collecting a set of real-time data from the user indicative of a reaction to the executed physical interaction item; determining a second personality profile for the device including a second distribution over a plurality of second character traits, wherein the second personality profile replaces the first personality profile; and, updating the second personality to enable execution of at least one modified physical interaction item.

17 Claims, 8 Drawing Sheets

(56) References Cited

U.S. PATENT DOCUMENTS

| | | | |
|---|---|---|---|
| 2015/0278835 A1* | 10/2015 | Hande | G06Q 50/01 705/7.32 |
| 2016/0026669 A1* | 1/2016 | Honda | A63F 13/30 707/749 |
| 2016/0031081 A1* | 2/2016 | Johnson | H04L 9/3231 700/250 |
| 2018/0108353 A1 | 4/2018 | Gustafson et al. | |
| 2018/0242149 A1* | 8/2018 | Verma | H04L 63/08 |
| 2019/0224853 A1* | 7/2019 | Gewecke | B25J 9/163 |

* cited by examiner

SYSTEM AND METHOD FOR ADJUSTMENT OF A DEVICE PERSONALITY PROFILE

CROSS-REFERENCE TO RELATED APPLICATIONS

This application claims the benefit of U.S. Provisional Application No. 62/690,005 filed on Jun. 26, 2018, the contents of which are hereby incorporated by reference.

TECHNICAL FIELD

The present disclosure relates generally to social robots, and, more specifically, to a method for customizing user models of social robots based on an active learning technique.

BACKGROUND

Electronic devices, including personal electronic devices such as smartphones, tablet computers, consumer robots, and the like, have been recently designed with ever increasing capabilities. Such capabilities fall within a wide range, including, for example, automatically cleaning or vacuuming a floor, playing high definition video clips, identifying a user by a fingerprint detector, running applications with multiple uses, accessing the internet from various locations, and the like.

In recent years, microelectronics advancement, computer development, control theory development and the availability of electro-mechanical and hydro-mechanical servo-mechanisms, among others, have been key factors in a robotics evolution, giving rise to a new generation of automatons known as social robots. Social robots can conduct what appears to be emotional and cognitive activities, interacting and communicating with people in a simple and pleasant manner following a series of behaviors, patterns and social norms. Advancements in the field of robotics have included the development of biped robots with human appearances that facilitate interaction between the robots and humans by introducing anthropomorphic human traits in the robots. The robots often include a precise mechanical structure allowing for specific physical locomotion and handling skill.

Social robots are autonomous machines that interact with humans by following social behaviors and rules. The capabilities of these social robots have increased over the years and currently social robots are capable of identifying users' behavior patterns, learning users' preferences and reacting accordingly, generating electro-mechanical movements in response to user's touch or vocal commands, and so on.

These capabilities enable social robots to be useful in many cases and scenarios, such as interacting with patients that suffer from various issues including autism spectrum disorder, stress, assisting users to initiate a variety of computer applications, providing various forms of assistance to elderly users, and the like. Social robots usually use multiple input and output resources, such as microphones, speakers, display units, and the like, to interact with their users.

Social robots are most useful when they are configured to offer personalized interactions with each user. One obstacle of these social robots is determining various aspects of a user's personality and traits to not only engage with a user in a useful and meaningful manner, but to do so at appropriate times. For example, if a social robot is configured to ensure that an older user is kept mentally engaged, it is imperative to know what topics the user is interested in, when the user is most likely to respond to interactions from the social robot, what contacts should be suggested to communicate with, and so on.

Devices that learn their users' behavioral patterns and preferences are currently available, though the known learning processes employed are limited and fail to provide a deep knowledge about the user who is the target of an interaction with such a device.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for adjusting a device personality profile, including: generating a first user profile that comprises at least a collection of a first set of parameters related to a user; selecting a first personality profile for a device based on matching the first user profile to one of a plurality of clusters of user profiles, wherein each of the clusters comprise a plurality of user profiles having a second set of parameters, wherein each cluster of the plurality of clusters is previously associated with a unique personality profile of a device, and wherein the first personality profile of the device comprises a first distribution over a plurality of character traits in a multidimensional space; sampling at least one character trait from the first distribution; causing the device to execute at least a physical interaction item, wherein the at least a physical interaction item is executed with respect to the sampled at least one character traits; collecting a set of real-time data from the user from at least sensory information received from at least a sensor of the device, wherein the set of real-time data, when analyzed, is indicative of the user reaction to the executed at least a physical interaction item; determining, based on an analysis of the set of real-time data that is indicative of the user reaction, a second personality profile for the device, wherein the second personality profile comprises a second distribution over a plurality of second character traits, wherein the second personality profile replaces the first personality profile; and, updating the second personality to enable execution of at least one modified physical interaction item.

Certain embodiments disclosed herein also include a non-transitory computer readable medium having stored thereon instructions for causing a processing circuitry to perform a process, the process including: generating a first user profile that comprises at least a collection of a first set of parameters related to a user; selecting a first personality profile for a device based on matching the first user profile to one of a plurality of clusters of user profiles, wherein each of the clusters comprise a plurality of user profiles having a second set of parameters, wherein each cluster of the plurality of clusters is previously associated with a unique personality profile of a device, and wherein the first personality profile of the device comprises a first distribution over a plurality of character traits in a multidimensional space; sampling at least one character trait from the first distribution; causing the device to execute at least a physical interaction item, wherein the at least a physical interaction item is executed with respect to the sampled at least one character traits; collecting a set of real-time data from the user from at least sensory information received from at least a sensor of the device, wherein the set of real-time data, when analyzed, is indicative of the user reaction to the executed at least a physical interaction item; determining, based on an analysis of the set of real-time data that is indicative of the user reaction, a second personality profile for the device, wherein the second personality profile comprises a second distribution over a plurality of second character traits, wherein the second personality profile replaces the first personality profile; and, updating the second personality to enable execution of at least one modified physical interaction item.

Certain embodiments disclosed herein also include a system for adjusting a device personality profile, including: a processing circuitry; and a memory, the memory containing instructions that, when executed by the processing circuitry, configure the system to: generate a first user profile that comprises at least a collection of a first set of parameters related to a user; select a first personality profile for a device based on matching the first user profile to one of a plurality of clusters of user profiles, wherein each of the clusters comprise a plurality of user profiles having a second set of parameters, wherein each cluster of the plurality of clusters is previously associated with a unique personality profile of a device, and wherein the first personality profile of the device comprises a first distribution over a plurality of character traits in a multidimensional space; sample at least one character trait from the first distribution; cause the device to execute at least a physical interaction item, wherein the at least a physical interaction item is executed with respect to the sampled at least one character traits; collect a set of real-time data from the user from at least sensory information received from at least a sensor of the device, wherein the set of real-time data, when analyzed, is indicative of the user reaction to the executed at least a physical interaction item; determine, based on an analysis of the set of real-time data that is indicative of the user reaction, a second personality profile for the device, wherein the second personality profile comprises a second distribution over a plurality of second character traits, wherein the second personality profile replaces the first personality profile; and, update the second personality to enable execution of at least one modified physical interaction item.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for customizing a user model of an interactive device based on optimized questions. The sensory inputs are analyzed with at least one privacy rule. The result of the analysis is indicative of a current privacy class of the person. After the current privacy class is determined, the device may initiate an engagement with the person based on the current privacy class.

Figure 1A:
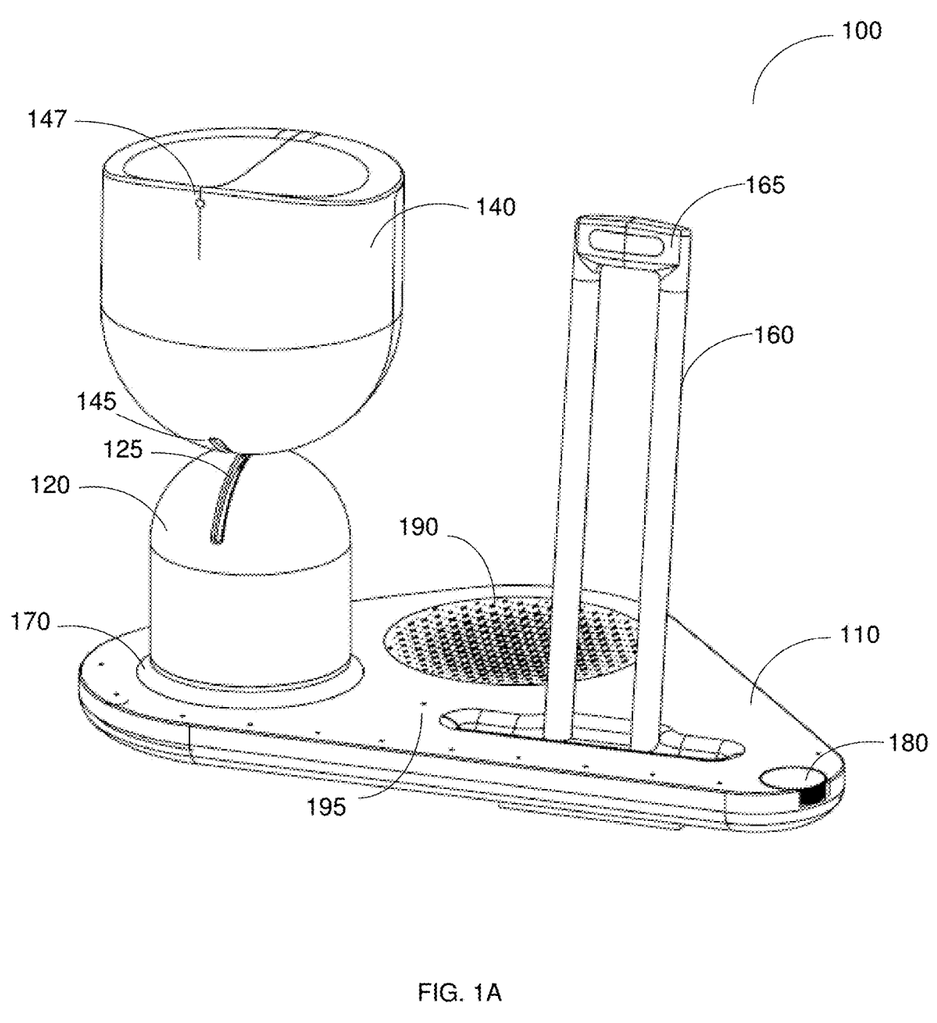
FIG. 1A is a schematic diagram of a device for performing emotional gestures according to an embodiment.

FIG. 1 is an example schematic diagram of a device 100 for performing emotional gestures according to an embodiment. The device 100 may be a social robot, a communication robot, and the like. The device 100 includes a base 110, which may include therein a variety of electronic components, hardware components, and the like. The base 110 may further include a volume control 180, a speaker 190, and a microphone 195.

A first body portion 120 is mounted to the base 110 within a ring 170 designed to accept the first body portion 120 therein. The first body portion 120 may include a hollow hemisphere mounted above a hollow cylinder, although other appropriate bodies and shapes may be used while having a base configured to fit into the ring 170. A first aperture 125 crossing through the apex of the hemisphere of the first body portion 120 provides access into and out of the hollow interior volume of the first body portion 120. The first body portion 120 is mounted to the base 110 within the confinement of the ring 170 such that it may rotate about its vertical axis symmetry, i.e., an axis extending perpendicular from the base. For example, the first body portion 120 rotates clockwise or counterclockwise relative to the base 110. The rotation of the first body portion 120 about the base 110 may be achieved by, for example, a motor (not shown) mounted to the base 110 or a motor (not shown) mounted within the hollow of the first body portion 120.

The device 100 further includes a second body portion 140. The second body portion 140 may additionally include a hollow hemisphere mounted onto a hollow cylindrical portion, although other appropriate bodies may be used. A second aperture 145 is located at the apex of the hemisphere of the second body portion 140. When assembled, the second aperture 145 is positioned to align with the first aperture 125.

The second body portion 140 is mounted to the first body portion 120 by an electro-mechanical member (not shown) placed within the hollow of the first body portion 120 and protruding into the hollow of the second body portion 140 through the first aperture 125 and the second aperture 145.

In an embodiment, the electro-mechanical member enables motion of the second body portion 140 with respect to the first body portion 120 in a motion that imitates at least an emotional gesture understandable to a human user. The combined motion of the second body portion 140 with respect to the first body portion 120 and the first body portion 120 with respect to the base 110 is configured to correspond to one or more of a plurality of predetermined emotional gestures capable of being presented by such movement. A head camera assembly 147 may be embedded within the second body portion 140. The head camera assembly 147 comprises at least one image capturing sensor that allows capturing images and videos.

The base 110 may be further equipped with a stand 160 that is designed to provide support to a user device, such as a portable computing device, e.g., a smartphone. The stand 160 may include two vertical support pillars that may include therein electronic elements. Example for such elements include wires, sensors, charging cables, wireless charging components, and the like and may be configured to communicatively connect the stand to the user device. In an embodiment, a camera assembly 165 is embedded within a top side of the stand 160. The camera assembly 165 includes at least one image capturing sensor (not shown).

Figure 1B:
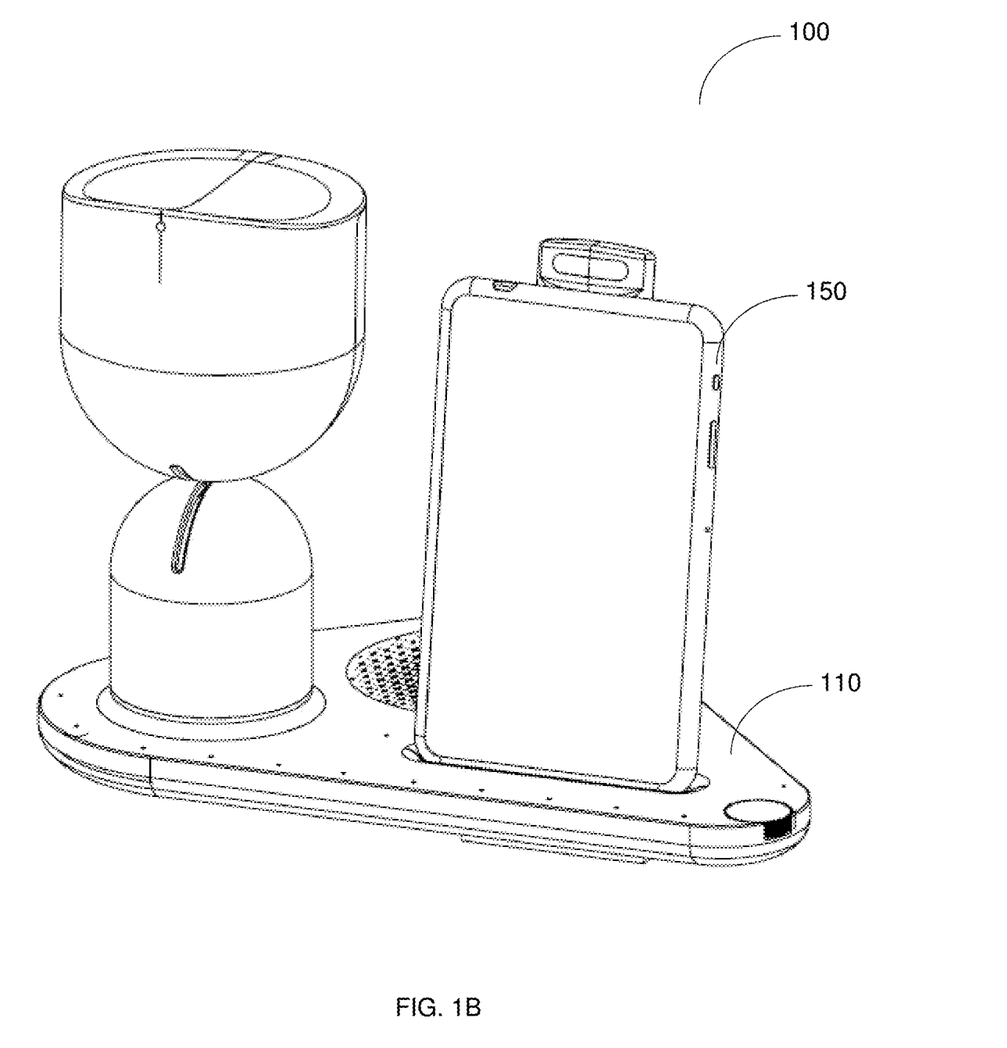
FIG. 1B is a schematic diagram of a device for performing emotional gestures with a user device attached thereto, according to an embodiment.

According to some embodiments, shown in FIG. 1B, a user device 150 is shown supported by the stand 160. The user device 150 may include a portable electronic device such as a smartphone, a mobile phone, a tablet computer, a wearable device, and the like. The device 100 is configured to communicate with the user device 150 via a controller (not shown). The user device 150 may further include at least a display unit used to display content, e.g., multimedia. According to an embodiment, the user device 150 may also include sensors, e.g., a camera, a microphone, a light sensor, and the like. The input identified by the sensors of the user device 150 may be relayed to the controller of the device 100 to determine whether one or more electro-mechanical gestures are to be performed.

Returning to FIG. 1A, the device 100 may further include an audio system, including, e.g., a speaker 190. In one embodiment, the speaker 190 is embedded in the base 110. The audio system may be utilized to, for example, play music, make alert sounds, play voice messages, and cause other audio or audiovisual signals to be generated by the device 100. The microphone 195, being also part of the audio system, may be adapted to receive voice instructions from a user.

The device 100 may further include an illumination system (not shown). Such a system may be implemented using, for example, one or more light emitting diodes (LEDs). The illumination system may be configured to enable the device 100 to support emotional gestures and relay information to a user, e.g., by blinking or displaying a particular color. For example, an incoming message may be indicated on the device by a LED pulsing green light. The LEDs of the illumination system may be placed on the base 110, on the ring 170, or within on the first or second body portions 120, 140 of the device 100.

Emotional gestures understood by humans are, for example and without limitation, gestures such as: slowly tilting a head downward towards a chest in an expression interpreted as being sorry or ashamed; tilting the head to the left of right towards the shoulder as an expression of posing a question; nodding the head upwards and downwards vigorously as indicating enthusiastic agreement; shaking a head from side to side as indicating disagreement, and so on. A profile of a plurality of emotional gestures may be compiled and used by the device 100.

In an embodiment, the device 100 is configured to relay similar emotional gestures by movements of the first body portion 120 and the second body portion 140 relative to each other and to the base 110. The emotional gestures may be predefined movements that mimic or are similar to certain gestures of humans. Further, the device 100 may be configured to direct the gesture toward a particular individual within a room. For example, for an emotional gesture of expressing agreement towards a particular user who is moving from one side of a room to another, the first body portion 120 may perform movements that track the user, such as a rotation about a vertical axis relative to the base 110, while the second body portion 140 may move upwards and downwards relative to the first body portion 120 to mimic a nodding motion.

An example device 100 discussed herein that may be suitable for use according to at least some of the disclosed embodiments is described further in PCT Application Nos. PCT/US18/12922 and PCT/US18/12923, now pending and assigned to the common assignee.

Figure 2:
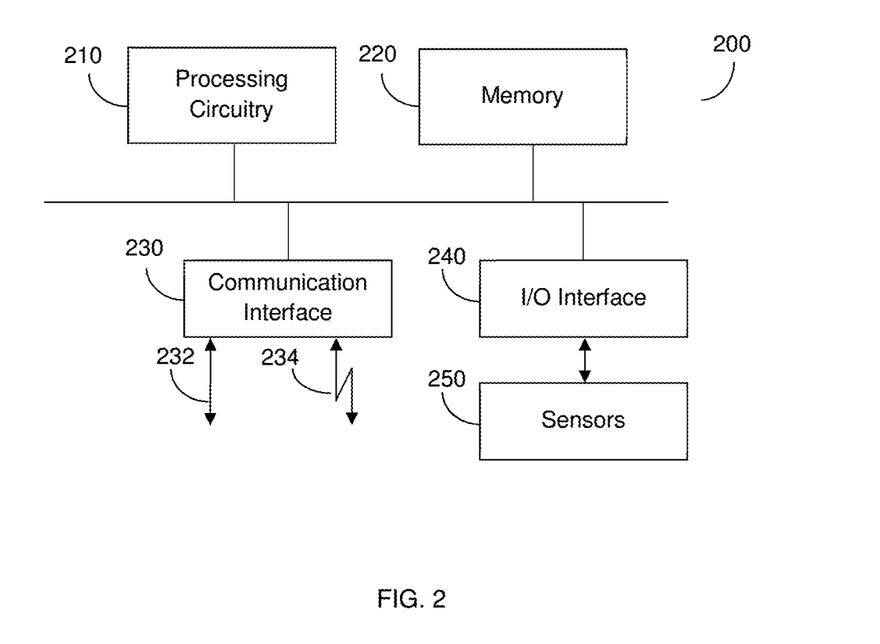
FIG. 2 is a block diagram of a controller for controlling a device for customizing a user model using optimized questioning according to an embodiment.

FIG. 2 is an example block diagram of a controller 200 of the device 100 implemented according to an embodiment. In an embodiment, the controller 200 is disposed within the base 110 of the device 100. In another embodiment, the controller 200 is placed within the hollow of the first body portion 120 or the second body portion 140 of the device 100. The controller 200 includes a processing circuitry 210 that is configured to control at least the motion of the various electro-mechanical segments of the device 100.

The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 200 further includes a memory 220. The memory 220 may contain therein instructions that, when executed by the processing circuitry 210, cause the controller 210 to execute actions, such as, performing a motion of one or more portions of the device 100, receive an input from one or more sensors, display a light pattern, and the like. According to an embodiment, the memory 220 may store therein user information, e.g., data associated with a user's behavior pattern.

The memory 220 is further configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 210 to perform the various processes described herein. Specifically, the instructions, when executed, cause the processing circuitry 210 to cause the first body portion 120, the second body portion 140, and the electro-mechanical member of the device 100 to perform emotional gestures as described herein, including retrieving a user model, determining optimal questions to pose to a user to update data items within the user model, relay the question to the user, and update the user model based on a user response.

In an embodiment, the instructions cause the processing circuitry 210 to execute proactive behavior using the different segments of the device 100 such as initiating recommendations, providing alerts and reminders, and the like using the speaker, the microphone, the user device display, and so on. In a further embodiment, the memory 220 may further include a memory portion (not shown) including the instructions.

The controller 200 further includes a communication interface 230 which is configured to perform wired 232 communications, wireless 234 communications, or both, with external components, such as a wired or wireless network, wired or wireless computing devices, and so on. The communication interface 230 may be configured to communicate with the user device, e.g., a smartphone, to receive data and instructions therefrom.

The controller 200 may further include an input/output (I/O) interface 240 that may be utilized to control the various electronics of the device 100, such as sensors 250, including sensors on the device 100, sensors on the user device 150, the electro-mechanical member, and more. The sensors 250 may include, but are not limited to, environmental sensors, a camera, a microphone, a motion detector, a proximity sensor, a light sensor, a temperature sensor and a touch detector, one of more of which may be configured to sense and identify real-time data associated with a user.

For example, a motion detector may sense movement, and a proximity sensor may detect that the movement is within a predetermined distance to the device 100. As a result, instructions may be sent to light up the illumination system of the device 100 and raise the second body portion 140, mimicking a gesture indicating attention or interest. According to an embodiment, the real-time data may be saved and stored within the device 100, e.g., within the memory 220, and may be used as historical data to assist with identifying behavior patterns, changes occur in behavior patterns, updating a user model, and the like.

It should be noted that the device 100 may be a stand-alone device, or may be implemented in, for example, a central processing unit of a vehicle, computer, industrial machine, smart printer, and so on, such that the resources of the above-mentioned example devices may be used by the controller 200 to execute the actions described herein. For example, the resources of a vehicle may include a vehicle audio system, electric seats, vehicle center console, display unit, and the like.

Figure 3:
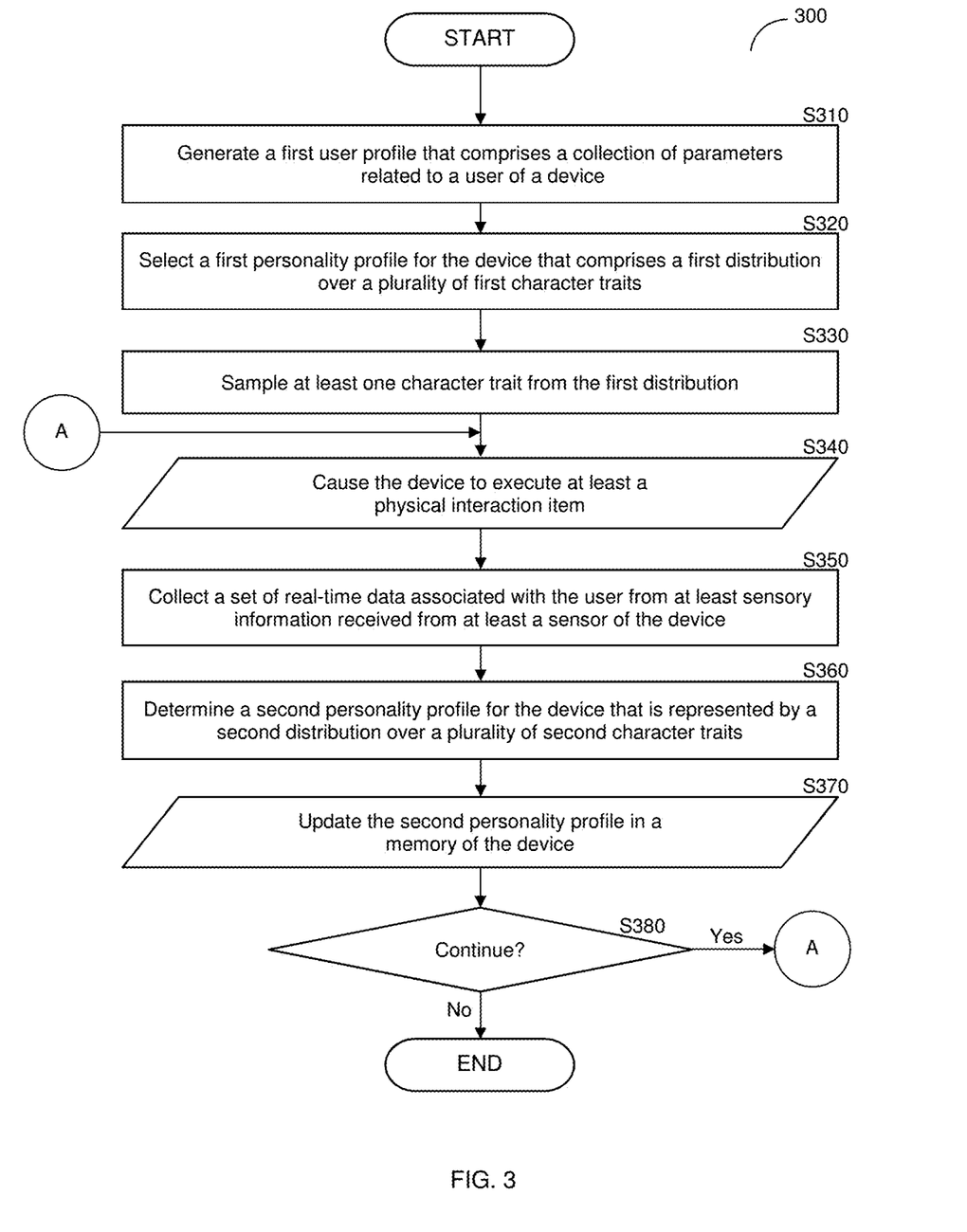
FIG. 3 is a flowchart of a method for adjusting a device personality profile according to an embodiment.

FIG. 3 is an example flowchart of a method for adjusting a device personality profile according to an embodiment.

At S310, a first user profile that includes at least a collection of a first set of parameters related to a user of a device is generated. The first user profile may be previously generated, e.g., by a controller such as controller 200 of FIG. 2, by collecting and analyzing the first set of parameters that may be indicative of various data relating to the user, such as, for example, a geographic location of the user, a user gender, a user nationality, various user preferences, and the like. That is to say, the first user profile consists of the first set of parameters.

At S320, a first personality profile for the device is selected, e.g., from a storage or a database, based on a determination of a match of the first user profile to one of a plurality of clusters of user profiles. Each cluster includes a plurality of user profiles and have been previously associated with one specific personality profile of a device. The first personality profile of the device may include a cluster having a first distribution of a plurality of character traits in a multidimensional space as further described herein below. Each of the user profiles within the cluster includes a second set of parameters that may be indicative of various data relating to users associated with that cluster, such as, for example, a geographic location of a user, a user gender, a user nationality, a user preference, and the like.

For example, a first user profile indicates that the user is a female, that the user is 85 years old, that the user's nationality is American, and that the user lives in Texas. According to the same example, the user profile may be classified into a certain cluster of user profiles having similar parameters or characteristics, and the cluster to which the user profile is associated may be previously associated with a personality profile of the device that includes a certain distribution over a plurality of character traits, such as, relatively high level of seriousness, relatively low level of cynicism, and so on.

The first personality profile may be implemented as a personality space consisting of axes that represent character traits and the probability of each of the character traits to apply at a certain level. The personality space is representative of a probability distribution for those character traits. For example, a personality profile may include two character traits, where the first is humor and the second is endearment. According to the same example, a first distribution that applies over the two character traits may indicate that the device has a 0.10 probability of having a 1 out of 5 level of humor, a 0.70 probability of having a 3 out of 5 level of humor, and so on. According to the same example, the distribution may also indicate that the device has a 0.60 probability of having a 4 out of 5 level of endearment, a 0.10 probability of having a 1 out of 5 level of endearment, and so on.

The character traits represent various approaches by which a device interacts with a user and includes, as non-limiting examples, a sense of humor of the device, a seriousness of the device, a cynicism of the device, sycophancy of the device, and so on. These traits are traits of the device in the sense that the device is configured to operate based on these assigned character traits. It should be noted that different devices may have different personality profiles, where the difference between the personality profiles of the devices is caused by the determination of user profiles of the users that are the targets of interaction with the devices.

At S330, at least one character trait is retrieved and sampled from the first distribution. In an embodiment, the sampling is executed randomly. According to another embodiment, the sampling is based on information such as real-time data, data collected from a user's electronic calendar, from the internet, from social media, and the like. That is to say, collected information may influence the sampling process.

At S340, the device is caused to execute at least a physical interaction item using the one or more portions of the device, e.g., first or second body portions 120 of device 100 of FIGS. 1A and 1B. The at least a physical interaction item is an action taken by the device to interact with a user, and is executed with respect to the sampled at least one character trait. The execution of the physical interaction item may include performing a motion by the one or more portions of the device, displaying a light pattern, emitting a sound or a voice, showing a video, and the like.

Each of the at least a physical interaction item is selected from a plurality of physical interaction items that have previously been associated with at least one character trait, such that each physical interaction item is suitable for use with a certain level of character trait of the plurality of character traits. As a non-limiting example, if the character traits sampled from the first distribution indicate that the level of the sense of humor of the device is 5 out of 5, the level of seriousness of the device is 3 out of 5, and the level of cynicism of the device is 4 out of 5, the physical interaction item is selected to be executed using these values. According to the same example, it may be previously determined that in case the level of sense of humor of the device is 5 out of 5 and the level of cynicism of the device is 4 out of 5, greeting the user shall be executed in a specific manner using the specific gestures, specific tone, accompanied by specific light patterns, and so on.

At S350, a set of real-time data associated with the user is collected, e.g., from at least sensory information received from one or more sensors of the device. The set of real-time data is data collected based on how a user responds to a device, and may include, for example, a movement made by the user, a sound and sound level of a user response, the inclusion of a word or a sentence in the response, a user gesture, the distance at which the user is positioned with respect to the device, and the like. According to another embodiment, the real-time data may also include data collected, in real-time or near real-time, from the user's electronic calendar, from the internet, from social media, and the like.

The sensory information include signals received from one or more sensors of the device, such as the sensors 250 that were further discussed herein above in FIG. 2. The sensors may include, but are not limited to, environmental sensors, a camera, a microphone, a motion detector, a proximity sensor, a light sensor, a temperature sensor and a touch detector, one of more of which may be configured to sense and identify real-time data associated with the user.

The set of real-time data, when analyzed, is indicative of the user reaction to the execution of the at least a physical interaction item. According to one embodiment, the real-time data is analyzed to determine compliance of the user to the interaction. The analysis may include comparison of the collected real-time data to predetermined parameters that indicate a state of the user, such as, e.g., whether the user is happy, sad, laughing, crying, anxious, and the like. According to another embodiment, the analysis of the real-time data may be performed using, for example, machine learning techniques to identify the state of the user. According to another embodiment, a second user profile is generated based on the analysis of the real-time data such that a second personality profile of the device, as is further discussed herein below, may be determined based on the second user profile.

At S360, it is determined, based on analysis of the real-time data that is indicative of the user reaction, a second personality profile for the device 100. The second personality profile includes a second distribution over a plurality of a second set of character traits. The second personality profile may be implemented as a personality space consists of axes that represent the plurality of second character traits and the probability of each of the character traits to apply in a certain level. The plurality of second character traits may be indicative of, for example, an updated level of a sense of humor of the device, an updated level of seriousness of the device, an updated level of cynicism of the device, an updated level of sycophancy of the device, and so on.

The second personality profile replaces the first personality profile. In an embodiment, the second personality profile may be identical to the first personality profile. As a non-limiting example, the second personality profile may include a higher level of cynicism with respect to the first personality profile if the analyzed real-time data indicates that the user reacted in a positive manner to cynicism. According to one embodiment, it is determined which of a plurality of second personality profiles, i.e., updated personality profiles of the device, generates an interaction items allowing to receive the most positive reaction from the user. For example, after the execution of the at least a physical interaction item, the set of real-time data that is collected right after the execution may indicate that the user is twisting his or her face. Such an expression may be interpreted as the user not being pleased with the at least a physical interaction item executed by the device.

At S370, the second personality profile is updated. This updated profile may be stored for future retrieval, e.g., in a memory of the device or in a database. The updated second personality profile enables execution of at least one modified physical interaction item. The at least one modified physical interaction items is an interaction item that had been adjusted for the user based on the determination of the second personality profile. According to one embodiment, the second personality profile is periodically updated or a plurality of second personality profiles for the device are generated such that the personality profile that generates interaction items allowing to receive the most positive reaction from the user may be determined as an optimal personality profile.

A positive reaction of the user is indicative of a successful interaction. A successful interaction may be one that indicates on a user response quality score that is above a certain threshold, e.g. 7 out of 10. A user response quality score may be indicative of, for example, the compliance of the user to the interaction. The user response quality score may be, for example, a score on a scale of 1-10. As a non-limiting example, the user response quality score may be 5 out of 10 when using a first interaction item that is associated with high level of cynicism, while when using a low level of cynicism, the user response quality score may be 9 out of 10. According to one embodiment, the user response quality score may be determined upon identification that, for example, the user is smiling and clapping his/her hands right after the controller 200 caused the device 100 to tell the user a joke. Using the user response quality scores, the controller 200 is able to determine what is the personality profile that includes optimal character traits of the device 100 that causes the user to respond in the most positive manner. For example, the optimal responses received from the user may be when the device 100 generates interaction using high level of humor, or 5 out of 5 level of humor levels, low level of sycophancy, or 2 out of 5 level of sycophancy levels, and the like.

According to another embodiment, a current device mood is determined with respect to the user state. The current device mood may be determined based on collecting a set of real-time data associated with the user from at least sensory information received from at least a sensor of the device. According to another embodiment, real-time data may also include data collected, in real-time or near real-time, from the user's electronic calendar, from the internet, from social media, and the like.

The real-time data may be analyzed using a set of rules that defines what kind of interaction items the device should execute and how the interaction items should be executed in certain circumstances, in combination with the first personality profile or the second personality profile of the device. The set of rules may determine that, for example, in case the user is identified as sad, the device mood should be more loveable, less sarcastic, and so on, even if the second personality profile of the device consists of a high level of sarcasm.

According to another embodiment, upon determining the current device mood, it may be determined that no change is required from the determined personality profile, thus the device will use the determined personality profile for interacting with the user.

At S380, it is checked whether to continue the operation to execute additional physical interaction items and if so, execution continues with S340; otherwise, execution terminates.

Figure 4:
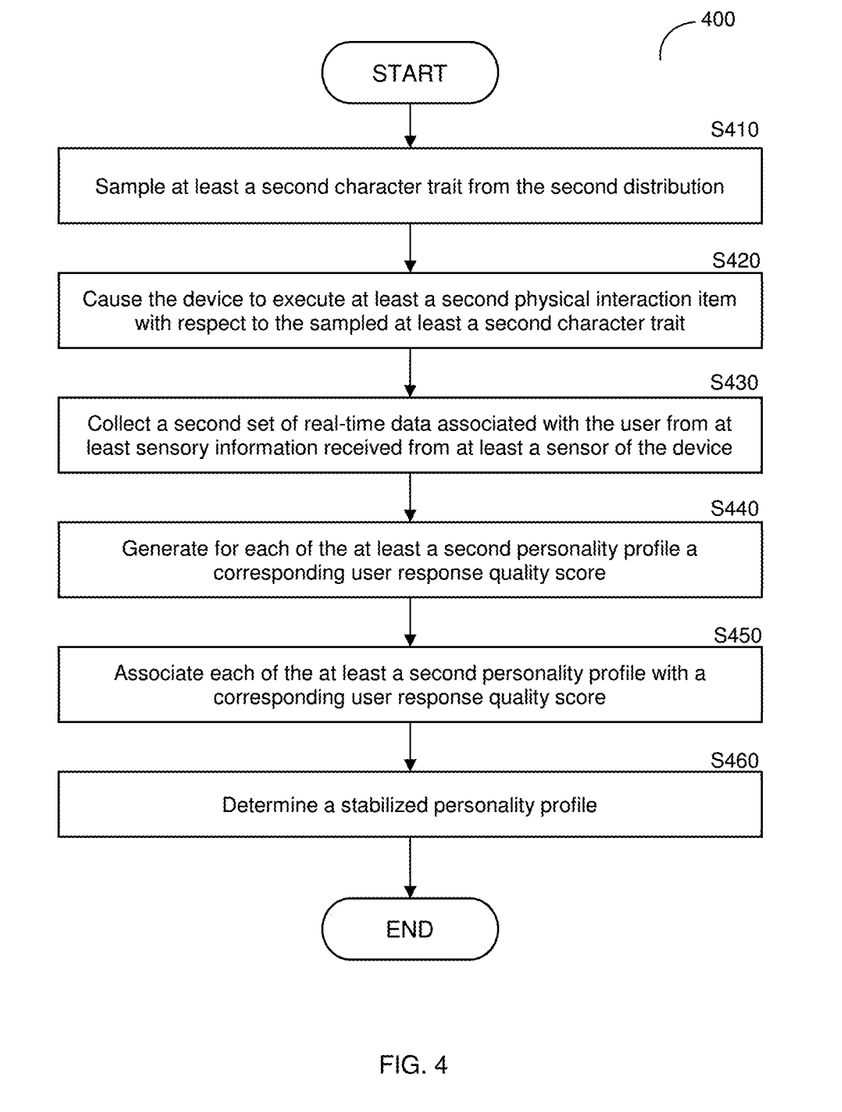
FIG. 4 is an flowchart of a method for determining a stabilized personality profile for a device according to an embodiment.

FIG. 4 is an example flowchart of a method for determining a stabilized personality profile for a device according to an embodiment.

At S410, at least a second character trait is sampled or retrieved from the second distribution, e.g., as discussed above in FIG. 3. In an embodiment, the sampling is executed randomly. According to another embodiment, the sampling is based on information such as real-time data, data collected from the user's electronic calendar, from the internet, from social media, and the like. That is to say, the collected information may influence the sampling process.

At S420, the device is caused to execute at least a second physical interaction item. The at least a second physical interaction item is executed with respect to the sampled at least a second character trait. The execution of the at least a second physical interaction item may include performing a motion by one or more portions of the device, displaying a light pattern, emitting a sound or a voice, showing a video, and the like. Each physical interaction item is selected from a plurality of physical interaction items that were previously associated with at least one character trait, such that each second physical interaction item is suitable for use with a certain level of character trait.

At S430, at least a second set of real-time data is collected from the user from at least the sensory information received from sensors of the device. The at least a second set of real-time data, when analyzed, is indicative of the user reaction to the execution of the at least a second physical interaction item. According to one embodiment, the real-time data is analyzed for determining compliance of the user to the interaction. The analysis may include comparison of the collected real-time data to predetermined parameters that indicate a state of the user, for example, whether the user is happy, sad, laughing, crying, anxious, and so on.

At S440, based on analysis of the at least a second set of real-time data, a corresponding user response quality score is generated for each of the at least a second personality profile. That is to say, the second set of personality values is selected, causing the device to execute the at least a second physical interaction item and collect real-time data that is indicative of the user's reaction, multiple times. Thus, a plurality of second, i.e., updated, personality profiles with their corresponding collected real-time data may be stored in a memory, a database, and the like.

At S450, each of the at least a second personality profile is associated with a corresponding user response quality score. A user response quality score may be a classification of the reaction of the user to the interaction. The user response quality score may be, for example, a score on a scale of 1-10. As a non-limiting example, the user response quality score may be 5 out of 10 when using a first interaction item that is associated with high level of cynicism, however when using a low level of cynicism, the user response quality score may be 9 out of 10. According to one embodiment, the user response quality score may be determined upon identification that, for example, the user is smiling and clapping his or her hands right after the device has told the user a joke. Using the user response quality scores, the it may be determined which personality profile that includes a set of personality values, i.e., optimal character traits, of the device causes the user to respond in the most positive manner. For example, optimal responses received from the user may be when the device generates interaction using high level of humor, or 9 out of 10 level of humor levels, a low level of sycophancy, or 2 out of 10 level of sycophancy levels, and so on.

At S460, a stabilized personality profile is determined. The stabilized personality profile is one of the second, i.e., updated, personality profiles that is associated with a highest user response quality score. For example, the optimal responses may be received from the user when the device generates an interaction using low level of humor, or 1 out of 5 level of humor levels, high level of sycophancy, or 4 out of 5 level of sycophancy levels, and the like. In an embodiment, the stabilized personality profile may be updated as well. That is to say, the device may periodically select, i.e. sampling, personality values to be used for interacting with the user based on an updated distribution of a plurality of sets of personality values associated with the stabilized personality profile.

Figure 5:
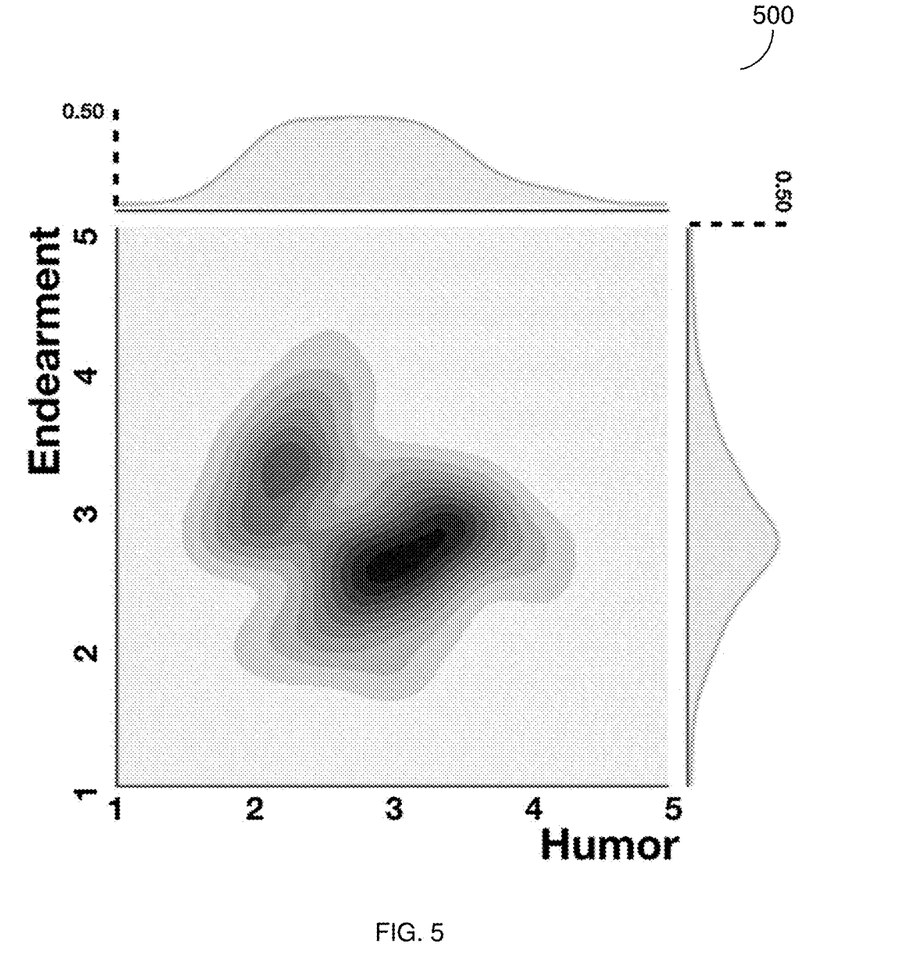
FIG. 5 is a graph describing an example of a personality profile having a first distribution over a plurality of character traits according to an embodiment.

FIG. 5 is a graph 500 describing an example of a personality profile 510 having a first distribution over a plurality of character traits according to an embodiment. The horizontal axis describes the example character trait humor. The numbers 0-5 of the humor axis indicate the level of the sense of humor. For example, the number 5 may represent full humor state while the number 0 may represent state at which no humor is used. The vertical axis describes the character trait endearment. For example, the number 5 may represent full endearment state while the number 0 may represent state at which no endearment is used. The distribution of the two character traits is represented by the different shades within the diagram 500. For example, the probability that the device will use the 3 level of humor and 2.75 level of endearment is represented by part of the darkest spot.

Figure 6:
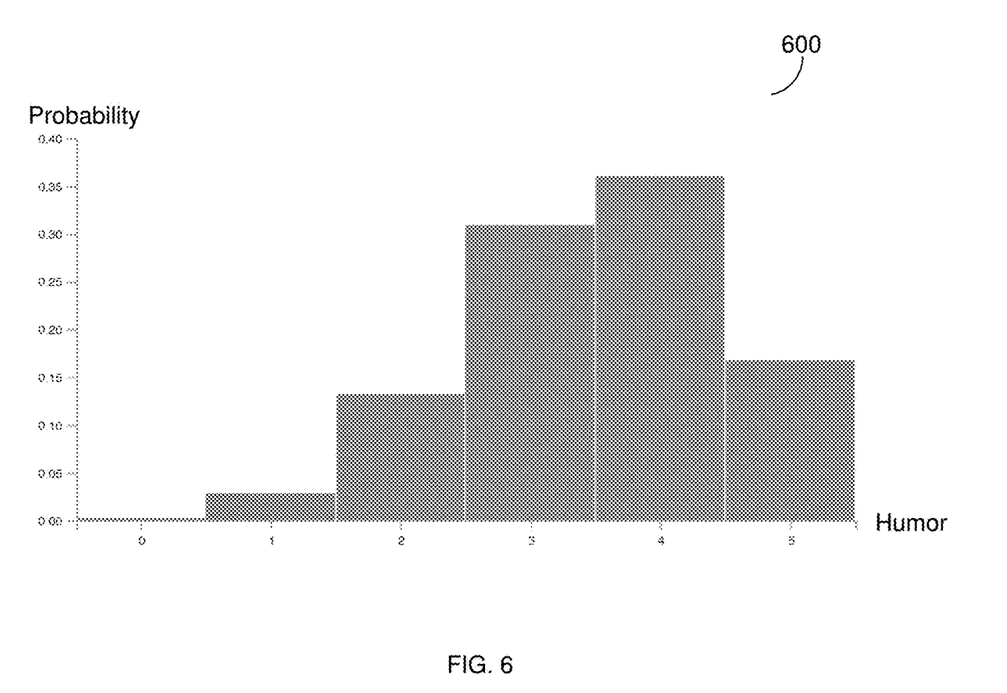
FIG. 6 is a bar graph describing a discrete distribution of a character trait according to an embodiment.

FIG. 6 is a bar graph 600 describing a discrete distribution of a character trait according to an embodiment. The horizontal axis describes the example character trait, humor. The numbers 0-5 of the humor axis indicate on the level of the sense of humor. For example, the number 5 may represent full humor state while the number 0 may represent state at which no humor is used. The vertical axis describes probability. For example, according to the graph 600, the probability that the device will use the 4th level of sense of humor is 0.35. It should be noted that this is only an example for a distribution of a single character trait; however, each of the first distribution and the at least a second distribution that are further discussed above with respect of FIGS. 3 and 4 may include a plurality character traits that may be implemented in multidimensional space.

Figure 7:
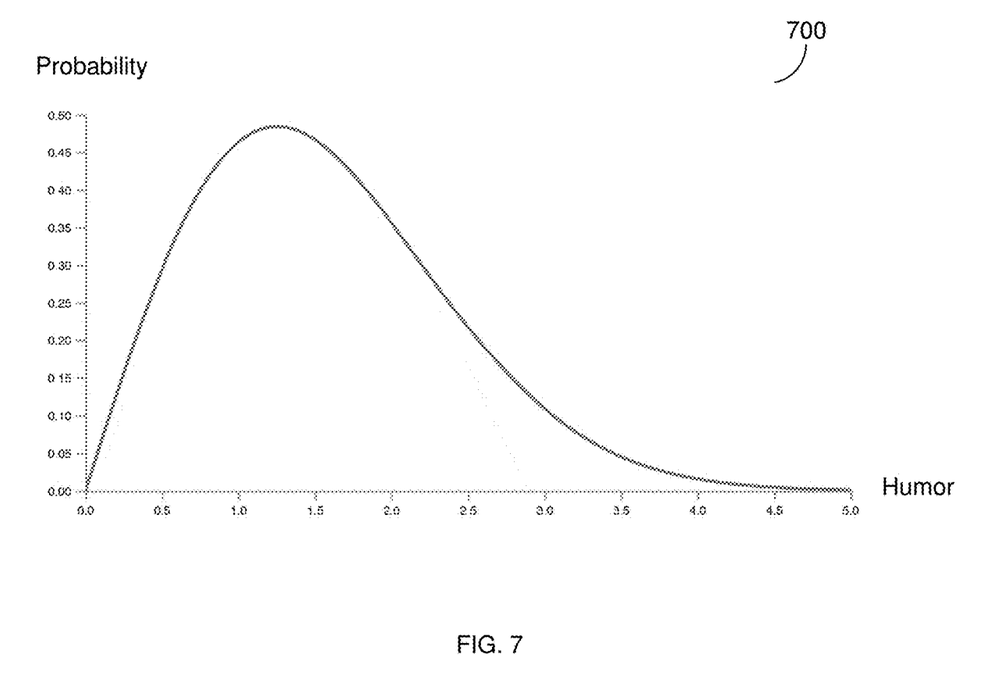
FIG. 7 is a graph describing a continuous distribution of a character trait according to an embodiment.

FIG. 7 is a graph 700 describing a continuous distribution of a character trait according to an embodiment. The horizontal axis describes the example character trait, humor. The numbers 0-5 of the humor axis indicate on the level of the sense of humor. For example, the number 5 may represent full humor state while the number 0 may represent state at which no humor is used. The vertical axis describes probability. For example, according to the graph 700, the probability that the device will use the third level of sense of humor is 0.10. It should be noted that this is only an example for a distribution of a single character trait however, each of the first distribution and the at least a second distribution that are further discussed above with respect of FIGS. 3 and 4 may include a plurality character traits that may be implemented in multidimensional space.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for adjusting a device personality profile, comprising:
   generating a first user profile that comprises at least a collection of a first set of parameters related to a user;
   selecting a first personality profile for a device based on matching the first user profile to one of a plurality of clusters of user profiles, wherein each of the clusters comprise a plurality of user profiles having a second set of parameters, wherein each cluster of the plurality of clusters is previously associated with a unique personality profile of a device, and wherein the first personality profile of the device comprises a first distribution over a plurality of character traits in a multidimensional space;
   sampling at least one character trait from the first distribution;
   causing the device to execute at least a physical interaction item, wherein the at least a physical interaction item is executed with respect to the sampled at least one character trait;
   collecting a set of real-time data from the user from at least sensory information received from at least a sensor of the device, wherein the set of real-time data, when analyzed, is indicative of a user reaction to the executed at least a physical interaction item;
   determining, based on an analysis of the set of real-time data that is indicative of the user reaction, a second personality profile for the device, wherein the second personality profile comprises a second distribution over a plurality of second character traits, wherein the second personality profile replaces the first personality profile; and,
   sampling at least a second character trait from the second distribution;
   updating the second personality profile to enable execution of at least one modified physical interaction item;
   causing the device to execute at least a second physical interaction item, wherein the at least a second physical interaction item is executed with respect to the sampled at least a second character trait.

2. The method of claim 1, wherein upon collecting the set of real-time data, a current device mood is determined, and wherein the current device mood is analyzed with the at least one of the first personality profile and the second personality profile.

3. The method of claim 1, wherein the at least a second physical interaction item is executed with respect to at least a second personality profile.

4. The method of claim 1, further comprising: collecting at least a second set of real-time data from the user from at least sensory information received from at least a sensor of the device, wherein the at least a second set of real-time data is indicative of the user reaction to the execution of the at least a second physical interaction item.

5. The method of claim 4, further comprising:
   generating for each of the at least a second personality profile a corresponding user response quality score based on analysis of the at least a second set of real-time data.

6. The method of claim 5, further comprising:
   associating each of the at least a second personality profile with a corresponding user response quality score.

7. The method of claim 6, further comprising:
   determining a stabilized personality profile, wherein the stabilized personality profile is associated with a highest user response quality score.

8. The method of claim 4, wherein upon collecting the at least a second set of real-time data, an updated current device mood is determined, wherein the current device mood is analyzed with the at least a second personality profile.

9. A non-transitory computer readable medium having stored thereon instructions for causing a processing circuitry to perform a process, the process comprising:
   generating a first user profile that comprises at least a collection of a first set of parameters related to a user;
   selecting a first personality profile for a device based on matching the first user profile to one of a plurality of clusters of user profiles, wherein each of the clusters comprise a plurality of user profiles having a second set of parameters, wherein each cluster of the plurality of clusters is previously associated with a unique personality profile of a device, and wherein the first personality profile of the device comprises a first distribution over a plurality of character traits in a multidimensional space;

sampling at least one character trait from the first distribution;

causing the device to execute at least a physical interaction item, wherein the at least a physical interaction item is executed with respect to the sampled at least one character trait;

collecting a set of real-time data from the user from at least sensory information received from at least a sensor of the device, wherein the set of real-time data, when analyzed, is indicative of a user reaction to the executed at least a physical interaction item;

determining, based on an analysis of the set of real-time data that is indicative of the user reaction, a second personality profile for the device, wherein the second personality profile comprises a second distribution over a plurality of second character traits, wherein the second personality profile replaces the first personality profile; and, sampling at least a second character trait from the second distribution;

updating the second personality to enable execution of at least one modified physical interaction item;

causing the device to execute at least a second physical interaction item, wherein the at least a second physical interaction item is executed with respect to the sampled at least a second character trait.

10. A system for adjusting a device personality profile, comprising:
a processing circuitry; and a memory, the memory containing instructions that, when executed by the processing circuitry, configure the system to:
generate a first user profile that comprises at least a collection of a first set of parameters related to a user;
select a first personality profile for a device based on matching the first user profile to one of a plurality of clusters of user profiles, wherein each of the clusters comprise a plurality of user profiles having a second set of parameters, wherein each cluster of the plurality of clusters is previously associated with a unique personality profile of a device, and wherein the first personality profile of the device comprises a first distribution over a plurality of character traits in a multidimensional space;
sample at least one character trait from the first distribution;
cause the device to execute at least a physical interaction item, wherein the at least a physical interaction item is executed with respect to the sampled at least one character trait;
collect a set of real-time data from the user from at least sensory information received from at least a sensor of the device, wherein the set of real-time data, when analyzed, is indicative of a user reaction to the executed at least a physical interaction item;

determine, based on an analysis of the set of real-time data that is indicative of the user reaction, a second personality profile for the device, wherein the second personality profile comprises a second distribution over a plurality of second character traits, wherein the second personality profile replaces the first personality profile; and, sample at least a second character trait from the second distribution;

update the second personality to enable execution of at least one modified physical interaction item;

causing the device to execute at least a second physical interaction item, wherein the at least a second physical interaction item is executed with respect to the sampled at least a second character trait.

11. The system of claim 10, wherein upon collecting the set of real-time data, a current device mood is determined, and wherein the current device mood is analyzed with the at least one of the first personality profile and the second personality profile.

12. The system of claim 10, wherein the at least a second physical interaction item is executed with respect to at least a second personality profile.

13. The system of claim 10, wherein the system is further configured to:
collect at least a second set of real-time data from the user from at least sensory information received from at least a sensor of the device, wherein the at least a second set of real-time data is indicative of the user reaction to the execution of the at least a second physical interaction item.

14. The system of claim 13, wherein the system is further configured to:
generate for each of the at least a second personality profile a corresponding user response quality score based on analysis of the at least a second set of real-time data.

15. The system of claim 14, wherein the system is further configured to:
associate each of the at least a second personality profile with a corresponding user response quality score.

16. The system of claim 15, wherein the system is further configured to:
determine a stabilized personality profile, wherein the stabilized personality profile is associated with a highest user response quality score.

17. The system of claim 13, wherein upon collecting the at least a second set of real-time data, an updated current device mood is determined, wherein the current device mood is analyzed with the at least a second personality profile.

* * * * *